United States Patent
Fields

(10) Patent No.: US 6,413,091 B1
(45) Date of Patent: Jul. 2, 2002

(54) CREATIVE STITCHERY SUCCESS STRIPS

(75) Inventor: Robbie M. Fields, Calhoun, GA (US)

(73) Assignee: Robbie Mae Fields, Calhoun, GA (US)

( * ) Notice: Subject to any disclaimer, the term of this patent is extended or adjusted under 35 U.S.C. 154(b) by 0 days.

(21) Appl. No.: 08/617,281

(22) Filed: Oct. 27, 1997

(51) Int. Cl.[7] ............................................. G09B 19/20
(52) U.S. Cl. ....................................... 434/95; 112/439
(58) Field of Search ........................... 434/95; 112/439, 112/475.01, 102.5, 401, 437, 136, 152; 283/115; 66/1 A

(56) References Cited

U.S. PATENT DOCUMENTS

| | | | | |
|---|---|---|---|---|
| 1,377,631 A | * | 5/1921 | Sadtler | 2/244 |
| 1,989,353 A | * | 11/1933 | Davis | 33/555.2 |
| 2,511,947 A | * | 6/1950 | Samuels | 66/1 A |
| 3,575,120 A | * | 4/1971 | Paulson | 112/136 |
| 3,741,468 A | * | 6/1973 | Servillat | 234/65 |
| 4,127,191 A | * | 11/1978 | Cave | 206/574 |
| 4,239,011 A | * | 12/1980 | Schultz | 112/266.1 |
| 4,404,750 A | * | 9/1983 | Marx | 33/1 B |
| 4,530,665 A | * | 7/1985 | Colonel | 434/95 |
| 4,608,939 A | * | 9/1986 | Lampley | 112/260 |
| 4,764,987 A | * | 8/1988 | Drei | 33/13 |

* cited by examiner

Primary Examiner—Derris H. Banks
Assistant Examiner—Kurt Fernstrom

(57) ABSTRACT

A set often embroidery stitch pattern transfer marking strips each constructed of flat, bendable, clear see-through plastic with resiliency assuring its continued integrity, rectangular in shape, the size of which fits in the hand having there-on two differently measured and numbered stitch patterns consisting of a plurality of identical separate round perforated holes with certain patterns having a perpendicular line extended to the outside horizontal edge of the strip indicating that a dot marking should be placed at this point resulting in the ability to mark two rows of equal distance between parallel marking points with each pattern having its own size, shape, alignment and configurations which when transferred onto a fabric, by the use of a disappearing ink marking pen, provides the means to teach and demonstrate precisely the art of constructing, by hand, blanket, back, chain, cross and feather stitches.

11 Claims, 9 Drawing Sheets

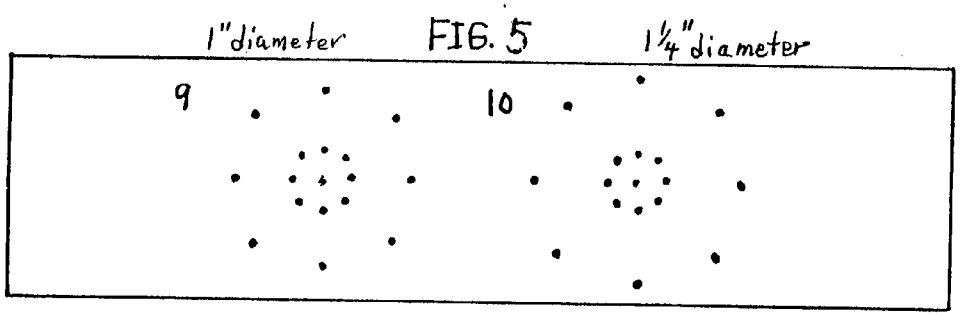
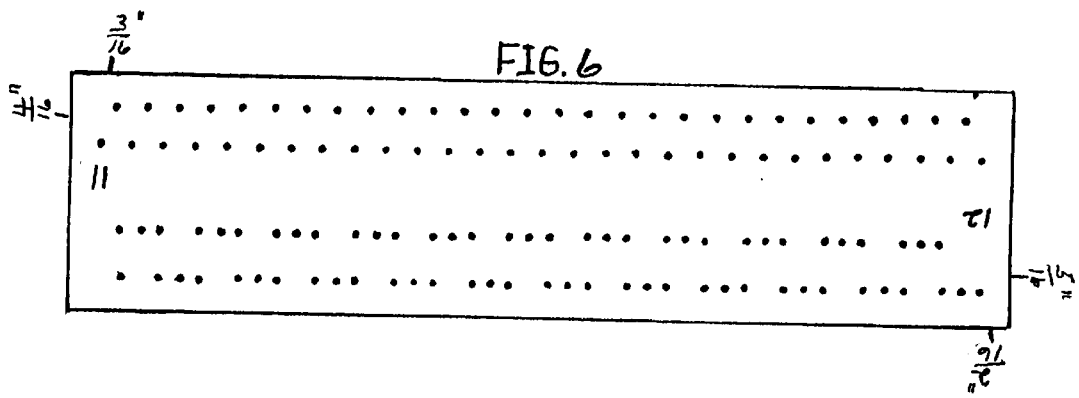
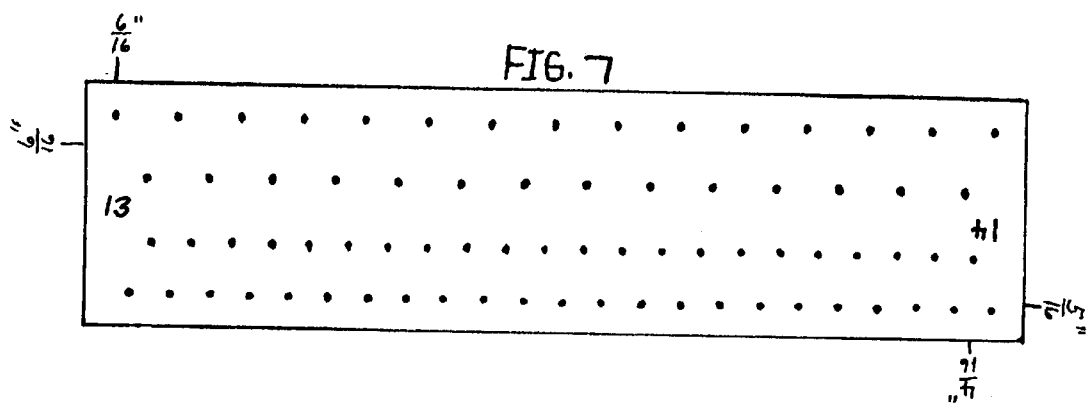
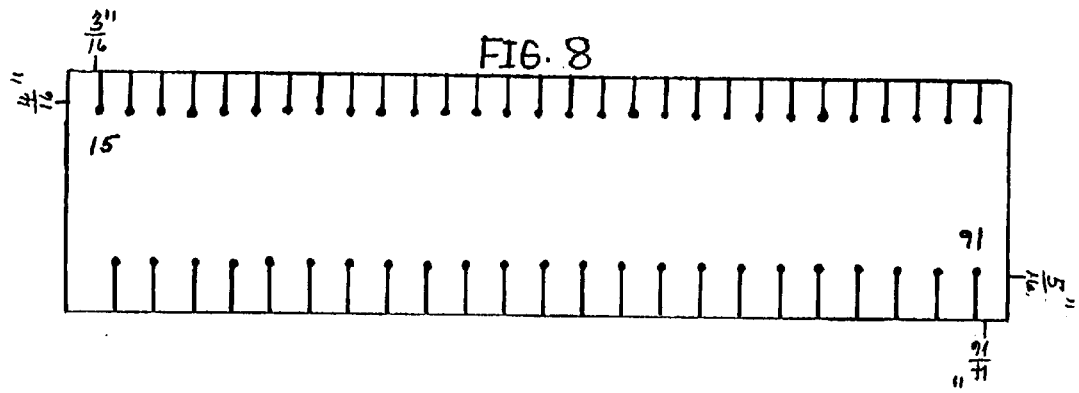

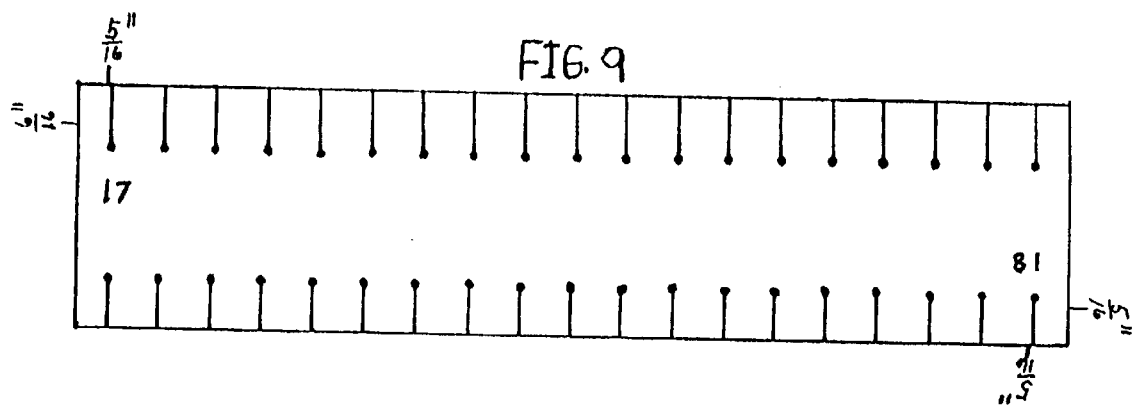
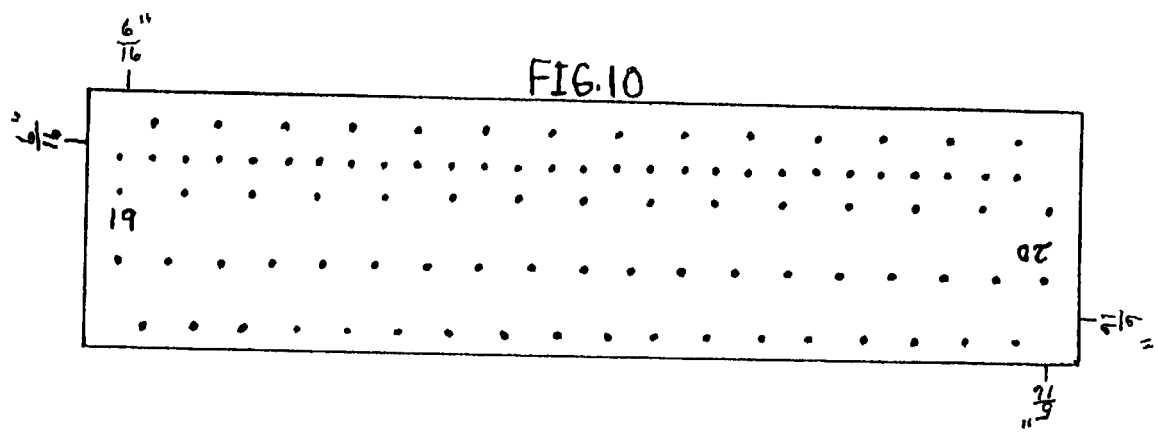

FIG. 11
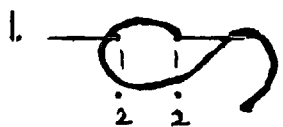
1.
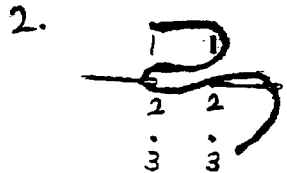
2.
FIG. 12
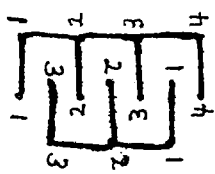
FIG. 13
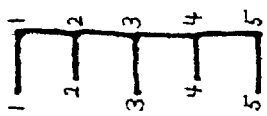
FIG. 14
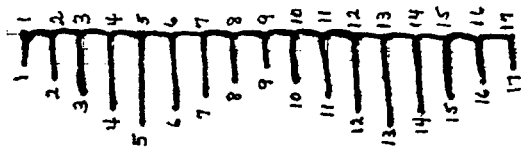
FIG. 15
1.
2.
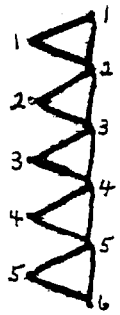
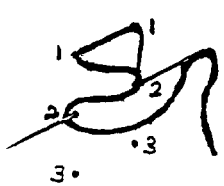
3.
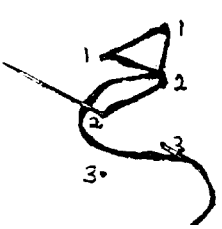
4.

CREATIVE STITCHERY SUCCESS STRIPS

CROSS REFERENCES TO RELATED APPLICATIONS

"Not Applicable"

STATEMENT REGARDING FEDERALLY SPONSORED RESEARCH AND DEVELOPMENT

"Not Applicable"

REFERENCE TO A "MICROFICHE APPENDIX"

"Not Applicable"

BACKGROUND OF THE INVENTION

My invention, entitled Creative Stitchery Success Strips, relates to an improved method of teaching a beginner, on their own, to master the art of constructing by hand, the five specific and distinct groups of embroidery stitch patterns which has been classified by The Department of Commerce, Patents and Trademarks Office as class 434 entitled Education and Demonstration.

In the art of embroidery stitching, as far as I am aware, it has been the practice in order for a beginner to acquire this art skill, it has been necessary for the beginner to be taught and shown the differing configurations, motions and sequence of steps in each of the five embroidery stitch groups along with the utmost importance of inserting an embroidery needle, with yarn, in equal distances whether stitching vertically, horizontally, in or out of alignment or at right angles in order to achieve any number of consecutive, precise and identical pattern stitches without the benefit of a device with exact measured perforated holes and markings which can be transferred to the finish side of all types of fabric thus providing consistency of size, shape, alignment and configuration which is crucial for accomplishing best results quickly eliminating the need for discouraging experimentation.

The purpose of the present invention is to provide such a device as an improvement over the prior art of constructing embroidery stitches by making available to the beginner, having no prior knowledge or skill in the ability to successfully construct embroidery pattern stitches, the relatively simple and inexpensive means to educate one's self by the use of the ten transfer pattern marking strips, along with illustrating to make clear in visible form, the best mode for carrying out the invention, on which is positioned appropriate, small, round perforated stitch pattern measurements adapted to the five differing groups of embroidery stitch patterns with particular strips having perpendicular lines drawn vertically from each of the equal distance between perforated holes to the horizontal edge of the strip which is employed to indicate that a dot marking should be placed at this point onto the fabric resulting in the ability to mark two rows of equal distance parallel marking points, which is required for various embroidery stitch pattern construction, with the pattern transfer marking strips being formed of transparent, see through flexible plastic, the perforated pattern measurements and markings are permanent and long lasting after continual use thus retaining their structure of size, shape, alignment and configuration, with the strips the size of which is comfortably held in the hand to provide stabilization of the marking strip to the fabric and with its see through quality, allowing for easy placement and correct transference of stitch pattern indicia onto the fabric thereby avoiding errors.

BRIEF SUMMARY OF THE INVENTION

The principle objective of the present invention is to provide the beginner, not possessing any prior knowledge or skill in the art of embroidery, with the ten embroidery stitch pattern transfer marking strips and the method for their use to correctly teach one's self to construct, by hand, all of the five specific groups of embroidery stitches named Blanket Stitch, Back Stitch, Chain Stitch, Cross Stitch, and Feather Stitch with each group having its own unique and particular features and sequence of stitching motions which, as far as I am aware, is a very important improvement to the prior art.

Another important object of the present invention to improve the prior art is that the embroidery stitch pattern transfer marking strips are both permanent and long lasting after continued use thereby assuring that all the accurately measured various positioned perforated holes and markings, arranged to conform to the five differing groups of embroidery stitch patterns, positioned on the strips, will retain their structure as to size, shape, alignment and configuration, with the strips comfortably held in the hand to provide stability of the marking strip to the fabric, with its see-through quality enabling the user to correctly locate the exact position to place the indicia onto any type of fabric which by the use of a disappearing ink marking pen which is both air and water soluble, inexpensive, available and commonly preferred by hand stitchers, quilters, and crafters, leaves no discoloration or sticky residue and the tip of which conforms to the perforated holes enabling the user to accomplish a safe, accurate and successful transposition of all pattern indicia from the embroidery stitch pattern transfer marking strips onto the fabric.

BRIEF DESCRIPTION OF THE DRAWINGS

The accompanying drawings of FIGS. 1 through 10 show for the purpose of example certain required embodiments in accordance with the present invention.

FIG. 5 is a flat plan view of two different embroidery stitch pattern measurements in accordance with the present invention.

FIG. 6 is a flat plan view of two different embroidery stitch pattern measurements in accordance with the present invention.

FIG. 7 is a flat plan view of two different embroidery stitch pattern measurements in accordance with the present invention FIG. 8 is a flat plan view of two different embroidery stitch pattern measurements in accordance with the present invention.

FIG. 9 is a flat plan view of two different embroidery stitch pattern measurements in accordance with the present invention.

FIG. 10 is a flat plan view of two different embroidery stitch pattern measurements in accordance with the present invention.

It should be noted that on the outside corners, where the two different stitch patterns are located on each of the ten marking strips, identified FIGS. 1 through 10, there are measurements shown to indicate the different stitch pattern measurement sizes.

FIGS. 11 through 35 are illustration drawings showing a visible representation to interpret, guide and direct the user thereof through the orderly numbered step process required in the best mode for carrying out the invention and it should also be noted that the illustration dot marking points are numbered to identify the orderly progression of the stitch construction along with an illustration of finished stitches shown.

FIGS. 11 through 15 illustrates the correct and orderly process of carrying out the steps required in the construction of Blanket Stitch Patterns.

FIG. 11 illustrates Steps 1 and 2 of the Basic Blanket Stitch.

FIG. 12 illustrates how two rows of Basic Blanket Stitches over-lapping slightly in the middle creates the Double Blanket Stitch.

FIG. 13 illustrates the Basic Blanket Stitch using the High-Low Stitch Pattern.

FIG. 14 illustrates the Basic Blanket Stitch using the Multi-Height Stitch Pattern.

FIG. 15 illustrates Steps 1 through 4 of the Closed Button-hole Stitch.

FIGS. 16 through 19 illustrates the correct and orderly process of carrying out the steps required in the construction of Back Stitch Patterns.

Figure 16:
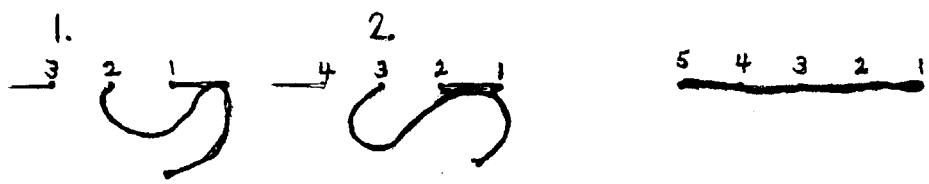

FIG. 16 illustrates Steps 1 and 2 of the Basic Back Stitch.

Figure 17:
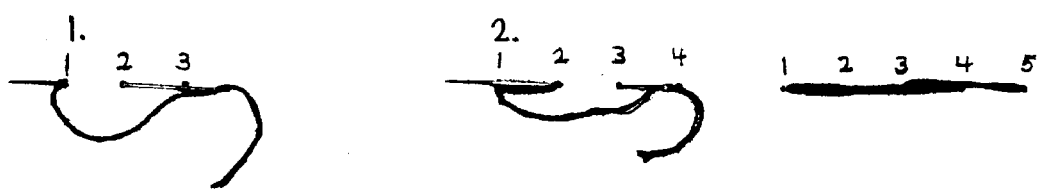

FIG. 17 illustrates Steps 1 and 2 of the Outline Stitch.

Figure 18:

FIG. 18 illustrates a more rope-like effect by re-entering the needle above the dot.

Figure 19:
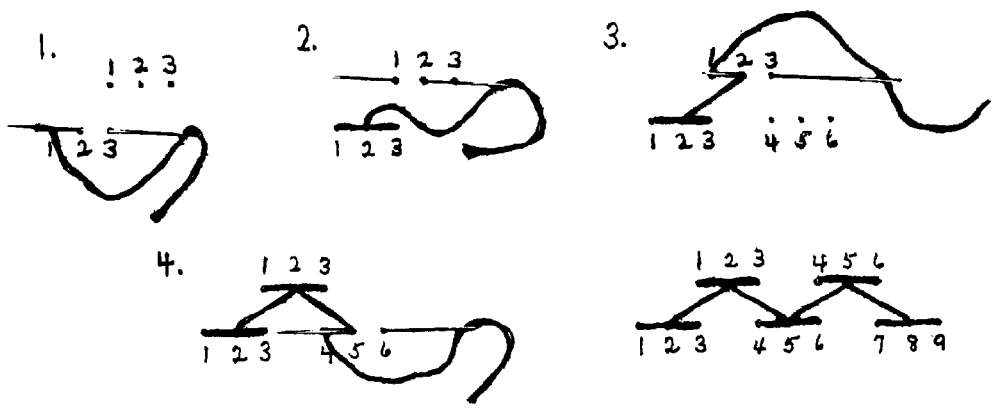

FIG. 19 illustrates Steps 1 through 4 of the Chevron Stitch.

FIGS. 20 through 27 illustrates the correct and orderly process of carrying out the steps required in the construction of Chain Stitch Patterns.

Figure 20:
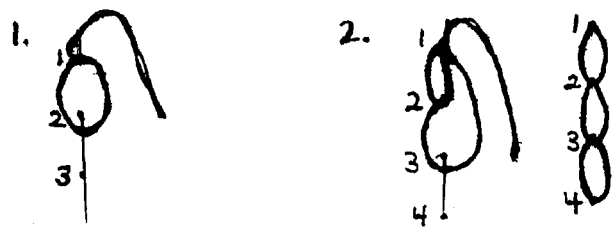

FIG. 20 illustrates Steps 1 and 2 of the Basic Chain Stitch.

Figure 21:
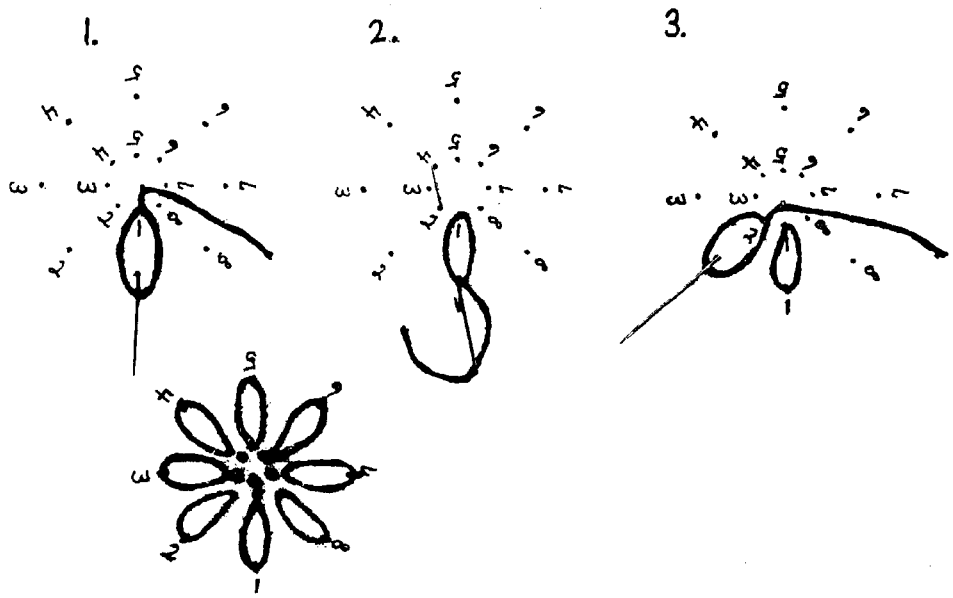

FIG. 21 illustrates Steps 1 through 3 of the Daisy Chain Stitch.

Figure 22:

FIG. 22 illustrates Step 1 for the construction of a French Knot.

Figure 23:
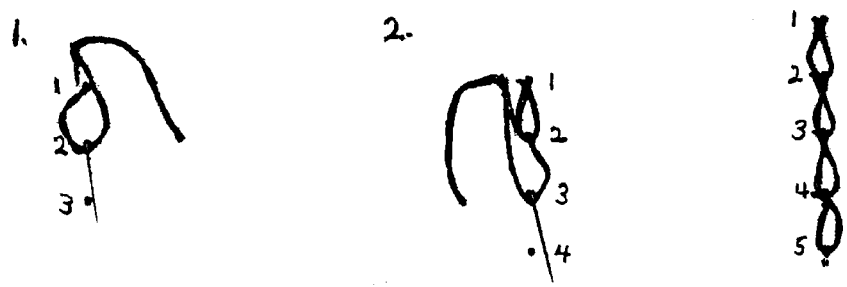
Figure 24:
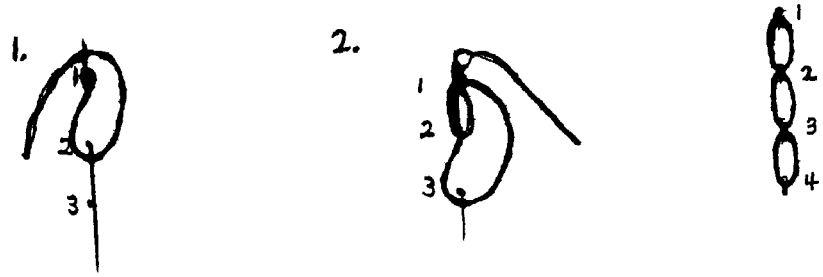

FIG. 23 illustrates Steps 1 and 2 of the Twisted Chain Stitch FIG. 24 illustrates Steps 1 and 2 of the Cable Chain Stitch.

Figure 25:
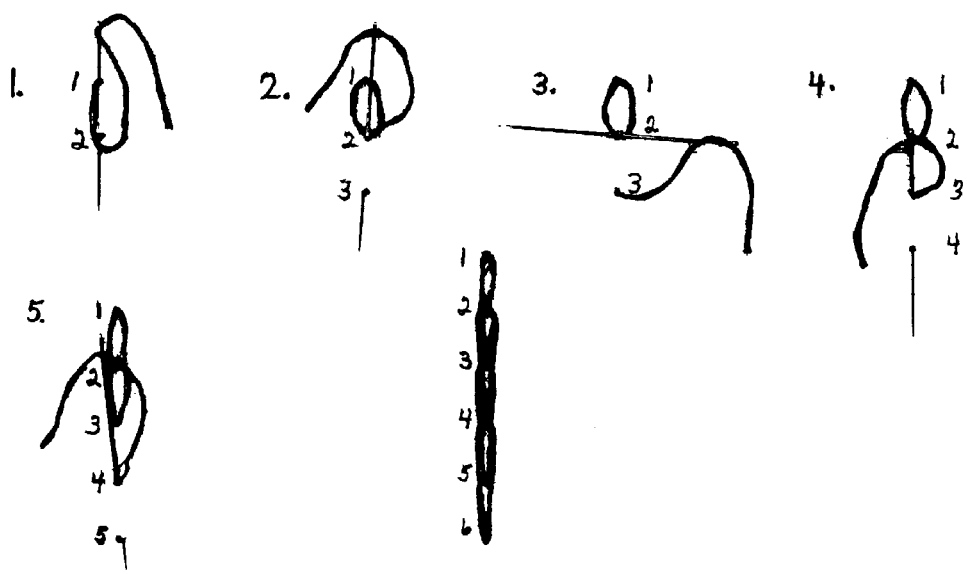

FIG. 25 illustrates Steps 1 through 5 of the Heavy Chain Stitch.

Figure 26:
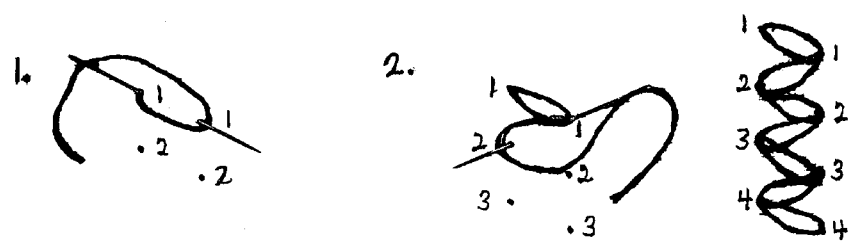

FIG. 26 illustrates Steps 1 and 2 of the Zig-Zag Chain Stitch.

Figure 27:
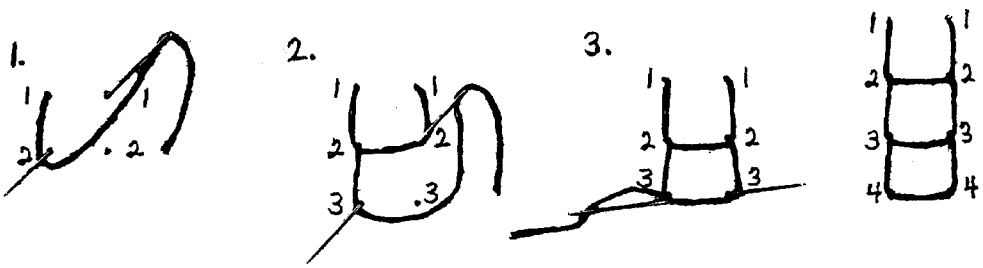

FIG. 27 illustrates Steps 1 through 3 of the Square Chain Stitch.

Figure 28:
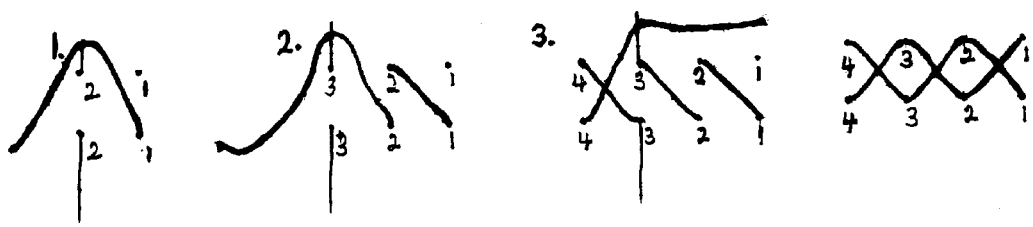
Figure 29:
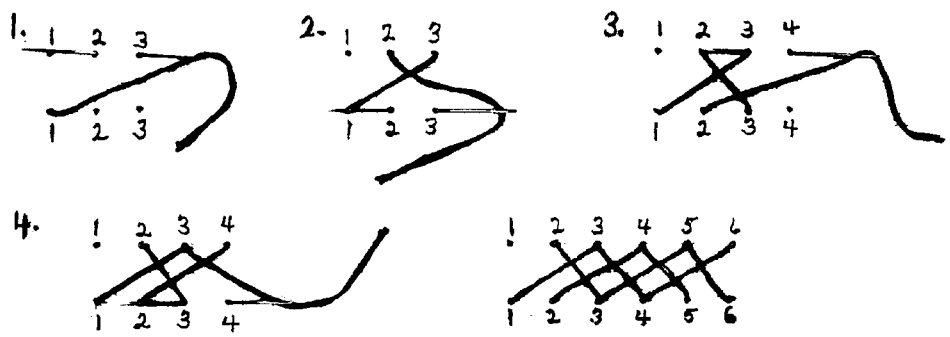
Figure 30:
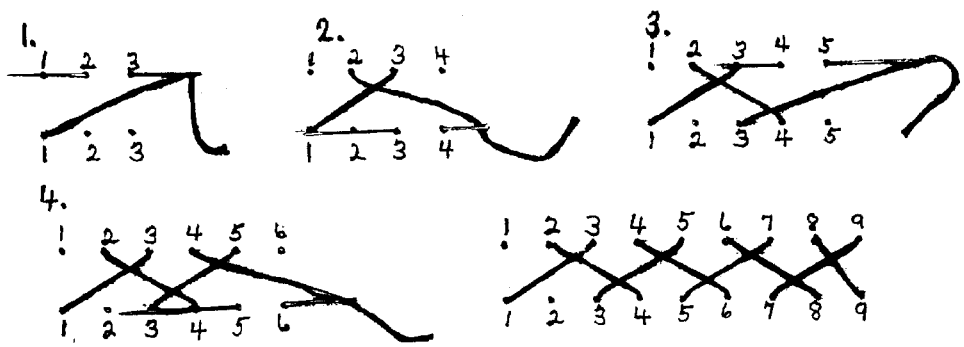

FIGS. 28 through 30 illustrates the correct and orderly process of carrying out the steps required in the construction of Cross Stitch Patterns.

FIG. 28 illustrates Steps 1 through 3 of the Basic Cross Stitch.

FIG. 29 illustrates Steps 1 through 4 of the Long-armed Cross Stitch.

FIG. 30 illustrates Steps 1 through 4 of the Herringbone Cross Stitch.

FIGS. 31 through 34 illustrates the correct and orderly process of carrying out the steps required in the Construction of Feather Stitch Patterns.

Figure 31:
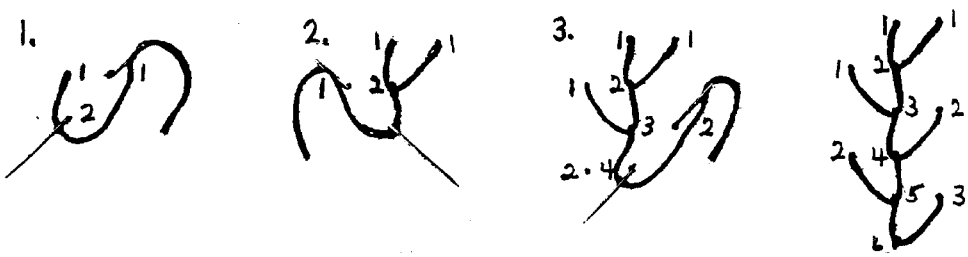

FIG. 31 illustrates Steps 1 through 3 of the Basic Feather Stitch.

Figure 32:
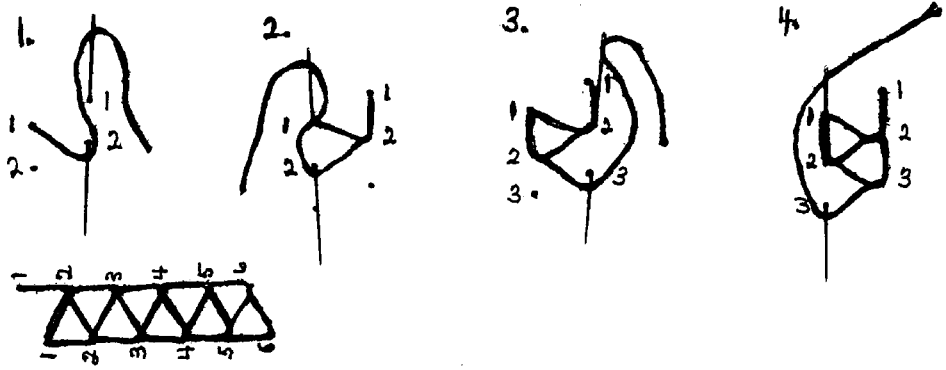

FIG. 32 illustrates Steps 1 through 4 of the Closed Feather Stitch.

Figure 33:
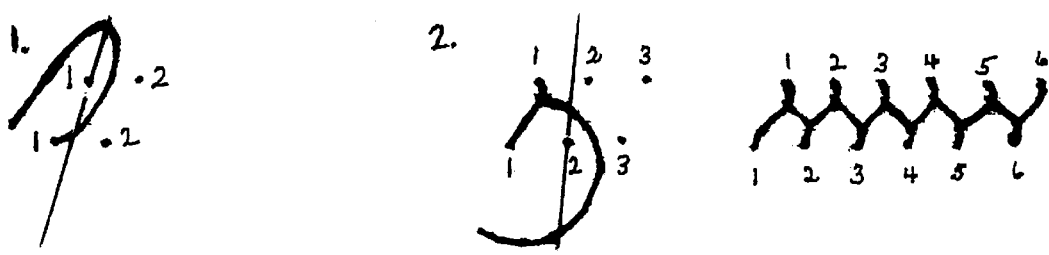

FIG. 33 illustrates Steps 1 and 2 of the Briar Stitch.

Figure 34:
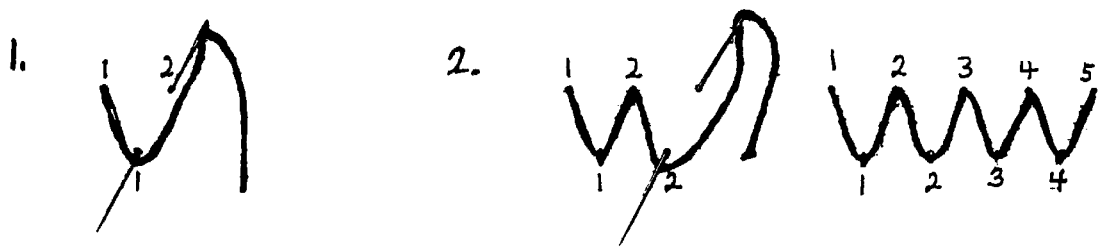

FIG. 34 illustrates Steps 1 and 2 of the Fly Stitch.

Figure 35:

FIG. 35 illustrates how a Running Stitch is constructed.

DETAILED DESCRIPTION OF THE INVENTION

Figure 1:
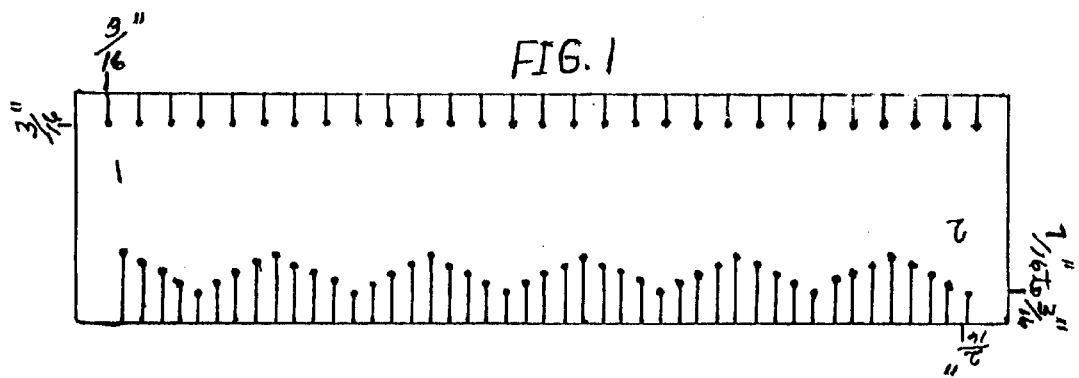
FIG. 1 is a flat plan view of two different embroidery stitch pattern measurements in accordance with the present invention.

Referring to the set often stitch pattern transfer marking strips of the present invention and the best mode for their use, it should be noted that the strips are formed of flexible, transparent plastic which is easily held in the hand to provide stabilization when transferring all the stitch pattern indicia onto the fabric, with its see-through quality providing for correct placement in transferring all stitch pattern indicia onto the fabric, its providing a permanent device which can be used over and over with all it's measured stitch pattern indicia retaining its structure as to alignment, shape, size and configuration while providing on each stitch pattern transfer marking strip two differing stitch pattern measurements with one of each located on the opposite horizontal sides of the strips which are identified as FIG. 1. Stitch Patterns 1 and 2, FIG. 2. Stitch Patterns 3 and 4, FIG. 3. Stitch Patterns 5 and 6, FIG. 4. Stitch Patterns 7 and 8, FIG. 5. Stitch Patterns 9 and 10, FIG. 6. Stitch Patterns 11 and 12, FIG. 7. Stitch Patterns 13 and 14, FIG. 8. Stitch Patterns 15 and 16, FIG. 9. Stitch Patterns 17 and 18, FIG. 10. Stitch Patterns 19 and 20, with certain stitch pattern transfer marking strips having perpendicular lines drawn vertically from each equal distance perforated hole to the outside edge of the strip to indicate to the user that a marking should be placed onto the fabric at this point resulting in the ability to mark two rows of equal distance parallel, marking points.

Further description of the present invention is to point out how the plurality of perforated holes, with some strips having perpendicular lines drawn vertically from the perforated holes to the horizontal outside edge of the marking strips, are arranged with respect to each other and conform to all the five distinct groups of embroidery stitch patterns named Blanket Stitch, Back Stitch, Chain Stitch, Cross Stitch and Feather Stitch as is hereby shown:

FIG. 1. Stitch Pattern 1 has a horizontal row of perforated holes with each hole being 3/16" apart and each hole having a vertical 3/16" perpendicular line drawn to the outside edge of the marking strip with the construction stitch size being 3/16" both vertically and horizontally.

FIG. 1. Stitch Pattern 2 has a horizontal row of multi-height, 7/16" to 3/16" perforated holes each being 2/16" apart and with perpendicular lines drawn from each hole to the outside edge of the marking strip with the construction stitch size being multi-height, 7/16" to 3/16" vertically and 3/16" horizontally.

Figure 2:
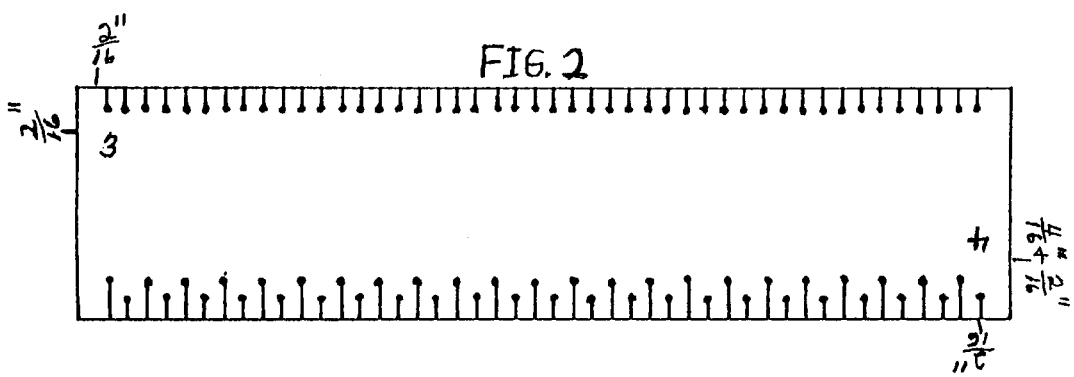
FIG. 2 is a flat plan view of two different embroidery stitch pattern measurements in accordance with the present invention.

FIG. 2. Stitch Pattern 3 has a horizontal row of perforated holes with each being 2/16" apart and each hole having a vertical 2/16" perpendicular line drawn to the outside edge of the marking strip with the construction stitch size being 2/16" both vertically and horizontally.

FIG. 2. Stitch Pattern 4 has a horizontal row of high-low perforated holes, 2/16" and 4/16", with each hole being 2/16" apart with vertical perpendicular lines drawn to the outside edge of the marking strip with the construction stitch size being 4/16" and 2/16", vertically and 2/16" horizontally.

Figure 3:
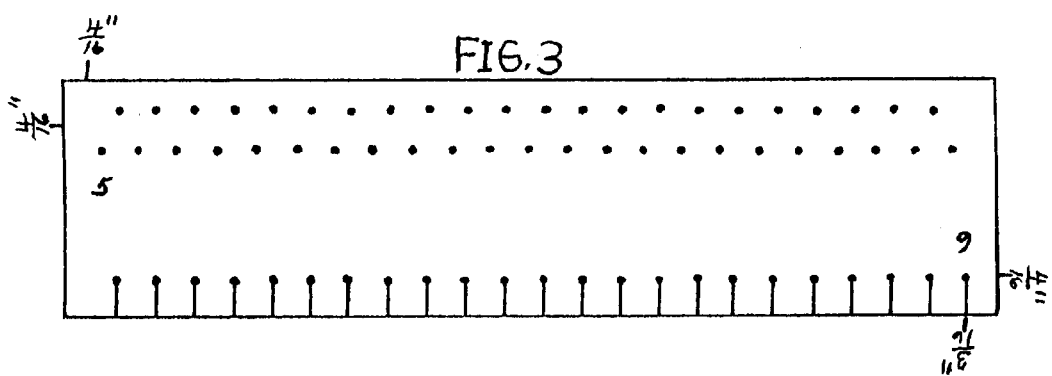
FIG. 3 is a flat plan view of two different embroidery stitch pattern measurements in accordance with the present invention.

FIG. 3. Stitch Pattern 5 has two, out of alignment by 2/16", parallel horizontal rows of perforated holes with each being 4/16" both vertically and horizontally with the construction stitch size being 4/16" both vertically and horizontally.

FIG. 3. Stitch Pattern 6 has a horizontal row of perforated holes with each being 3/16" apart and each hole having a vertical 4/16" perpendicular line drawn to the outside horizontal edge of the marking strip with the construction stitch size being, 4/16" vertically and 3/16" horizontally.

Figure 4:
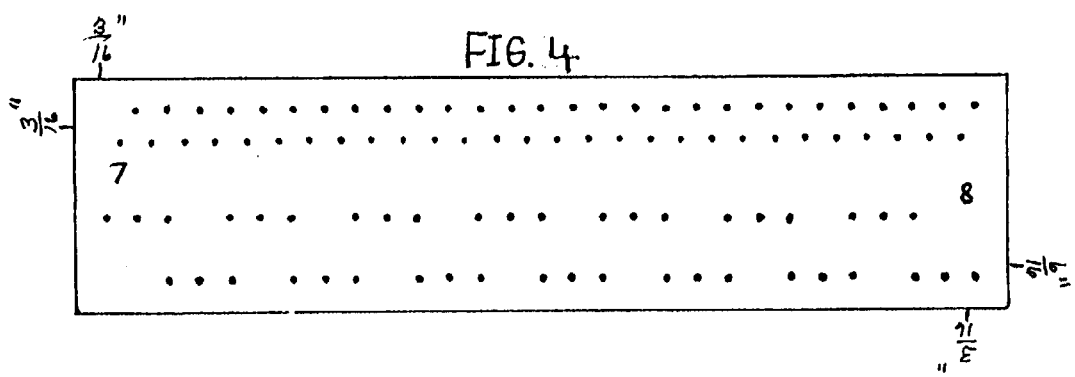
FIG. 4 is a flat plan view of two different embroidery stitch pattern measurements in accordance with the present invention.

FIG. 4. Stitch Pattern 7 has two parallel, horizontal rows of perforated holes with each being 3/16" apart both vertically and horizontally being out of alignment by one-half of 3/16" with the construction stitch size being 3/16" vertically and horizontally.

FIG. 4. Stitch Pattern 8 has two parallel rows in sequence of three perforated holes each being 3/16" apart, skipping 6/16" and placing three more holes 3/16" apart continuing the row in the same manner with the rows being out of alignment by 6/16" with the construction stitch size being 3/16" vertically and 18/16" horizontally.

FIG. 5. Stitch Pattern 9 and 10 both have the same configuration of perforated holes with the eight outside holes forming a large circle around the center point of the circle with pattern 9 having a 1" diameter and pattern 10 having a 1½" diameter.

FIG. 6. Stitch Pattern 11 has two parallel rows of perforated holes each being 4/16" vertically and 3/16" horizontally, out of alignment by one-half of 3/16" with the construction stitch size being 4/16" vertically and 3/16" horizontally.

FIG. 6. Stitch Pattern 12 has two parallel rows in sequence of three perforated holes 2/16" apart, skipping 4/16" and placing three more holes 2/16" apart continuing in the same manner along the row with the two rows out of alignment by 4/16" with the construction stitch size being 5/16" vertically and 12/16" horizontally.

FIG. 7. Stitch Pattern 13 has two, out of alignment by 3/16", parallel rows of perforated holes with each being 6/16" both vertically and horizontally with the construction stitch size being 6/16" vertically and 3/16" horizontally.

FIG. 7. Stitch Pattern 14 has two, out of alignment by 2/16", parallel rows of perforated holes with each being 5/16" vertically and 4/16" horizontally with the construction stitch size being 5/16" vertically and 4/16" horizontally.

FIG. 8. Stitch Pattern 15 has a horizontal row of perforated holes with each being 3/16" apart and each hole having a vertical 4/16" perpendicular line drawn to the outside edge of the marking strip with the construction stitch size being 4/16" vertically and 3/16" horizontally.

FIG. 8. Stitch Pattern 16 has a horizontal row of perforated holes with each being 4/16" apart and with each hole having a vertical 5/16" perpendicular line drawn to the outside edge of the marking strip with the construction stitch size being 5/16" vertically and 4/16" horizontally.

FIG. 9. Stitch Pattern 17 has a horizontal row of perforated holes with each being 5/16" apart and with each hole having a vertical 6/16" perpendicular line drawn to the outside edge of the marking strip with the construction stitch size being 6/16" vertically and 5/16" horizontally.

FIG. 9. Stitch Pattern 18 has a horizontal row of perforated holes with each being 5/16" apart and each hole having a vertical 5/16" perpendicular line drawn to the outside edge of the marking strip with the construction stitch size being 5/16" both vertically and horizontally.

FIG. 10. Stitch Pattern 19 has three parallel, horizontal rows of perforated holes with the two outside rows, out of alignment by 3/16" being 6/16" apart both vertically and horizontally, with the third row equally spaced 3/16" between the two outside rows, with the holes being 3/16" apart horizontally and with the construction stitch size being 6/16" both vertically and horizontally.

FIG. 10. Stitch Pattern 20 has two parallel, horizontal rows of perforated holes each being 6/16" vertically and 5/16" horizontally out of alignment by one-half of 5/16" with the construction stitch size being 6/16" vertically and 5/16" horizontally.

The present invention is expressly suited and intended for the given purpose of making available to all persons not possessing any prior knowledge or skill in the art of construction, by hand, embroidery stitch patterns the means to master the prior art by providing the visual, definite and orderly forms of all the five groups of embroidery stitch pattern indicies of the present invention shown on Sheets 1 of 3 through 3 of 3 along with illustration drawings of Sheets 4 through 9 and the following directions which serves to interpret its embodiments and guide the user thereof through all orderly transfer marking procedures, stitch motions, sequence of stitch steps and to make clear, by example, what I consider the best mode for carrying out the invention.

BLANKET STITCHES

Basic Blanket Stitch:

Mark two rows of even dots using Patterns 1, 3, or 6. Work from the top toward you. Step (1) 1$^{st}$ Stitch. Exit needle out dot 1 of right side. Pull thread through. Enter needle back into dot 1 of right side, close to thread, and exit out dot 1 of left side. With thread under tip of needle, pull thread through. Step (2) 2$^{nd}$ Stitch. Enter needle into dot 2 of right side, and exit needle out dot 2 of left side. With thread under tip of needle, pull thread through Work remaining stitches same as 2$^{nd}$ stitch, ending with exiting needle back through last dot just outside thread loop. Tie off.

Double Blanket Stitch:

Worked with same procedure as basic blanket stitch, except when you finish 1 row, mark a 2$^{nd}$ row the same measurement as first row, overlapping slightly in center. Work from top toward you.

High-Low Blanket Stitch:

Mark row of dots with Pattern 4. Work same way as basic blanket stitch. Work from top toward you.

Multi-Height Blanket Stitch:

Mark row of dots with Pattern 2. Work same procedure as basic blanket stitch. Work from top toward you.

Closed Button-Hole Stitch:

Mark with Patterns 5, 7, or 13. Work from top toward you. Step (1) and (2). 1$^{st}$ Stitch. Exit needle out dot 1 of right side. Pull thread through. Enter needle back into dot 1 and exit needle out dot 1 of left side. With thread under tip of needle, pull thread through Enter needle at dot 2 of right side and exit needle in same hole of dot 1 of left side. With thread under tip of needle, pull thread through. Step (3) and (4). Stitch 2. Enter needle back into dot 2 of right side and exit needle into dot 2 of left side with thread under tip of needle, pull thread through. Enter needle into dot 3 of right side and exit out dot 2 of left side with thread under tip of needle, pull thread through. Work same as for 2$^{nd}$ stitch to continue row. Ending with re-entering last dot outside of thread loop. Tie off.

BACK STITCHES

Basic Back Stitch:

Mark one row of dots using Patterns 1, 3, or 6. Work from right to left. Step (1) 1$^{st}$ Stitch. Exit needle out dot 2. Pull thread through. Enter needle into dot 1 and exit at dot 3. Pull thread through. Step (2) 2$^{nd}$ Stitch. Re-enter needle back into dot 2 and exit at dot 4. Pull thread through. Work remaining stitches same as 2$^{nd}$ stitch, ending with re-entering the last dot that completes the last stitch. Tie off.

Outline Stitch:

Mark one row of dot Patterns 1, 3, or 6. Work from left to right. Step (1) 1$^{st}$ Stitch. Exit needle out dot 1. Pull thread through. Enter needle in dot 2 and exit in same dot 1. Pull thread through. Step (2) 2$^{nd}$ Stitch. Enter needle in dot 3 and exit needle back through dot 2. Pull thread through. Work remaining stitches same as 2$^{nd}$ stitch, ending with entering last dot that completes last stitch. Tie off. A more rope-like effect stitch can be achieved by re-entering needle just above the same dot hole instead of in the hole.

Chevron Stitch:

Mark dot Patterns 8 or 12. Work left to right. Step (1) 1$^{st}$ Stitch. On bottom row, exit needle out dot 1. Pull thread through. Enter needle, on bottom row into dot 3 and exit through dot 2. Pull thread through. Step (2). On top line, enter needle through dot 2 and exit out dot 1. Pull thread through. Step (3). On top line, enter needle into dot 3 and exit out dot 2. Pull thread through. Step (4). On bottom line, enter needle into dot 5 and exit out dot 4. Pull thread through Enter needle at dot 6 and exit out dot 5. Pull thread through. 1 stitch is completed. 2$^{nd}$ Stitch. Follow same procedure starting at Step (2), except, of course, the top row dot numbers will be 4, 5, and 6. Work remaining stitches with same procedure. (Note) The needle thread lies in the middle of the rows when changing from bottom to top rows, otherwise, it lies outside of rows. End stitches with entering last dot of a completed stitch Tie off.

CHAIN STITCHES

Basic Chain:

Mark 1 row of dots using Patterns 1, 3, or 6. Work from top toward you. Step (1) Stitch 1. Exit needle out of dot 1. Pull thread through. Enter needle back into dot 1 and exit needle out dot 2. With thread under tip of needle, pull thread through. Step (2) 2$^{nd}$ Stitch. Enter needle back into dot 2 and exit out dot 3. With thread under tip of needle, pull thread through. Work remaining stitches same as 2$^{nd}$ stitch. End with entering last dot just outside thread loop to secure. Tie off.

Daisy Chain Stitch:

Mark flower Pattern 9. Step (1) 1$^{st}$ Stitch. Exit needle out inside dot 1. Pull thread through. Re-enter needle into inside dot 1 and exit at outside dot 1. With thread under tip of needle, pull thread through. Step (2). Enter needle just outside thread loop at outside dot 1 and exit into inside dot 2. Pull thread through. Step (3) 2$^{nd}$ Stitch. Re-enter inside dot 2 and exit at outside dot 2. With thread under tip of needle, pull thread through. Reenter outside dot 2 over chain loop and exit out inside dot 3. Pull thread through Continue around flower until completed. End with entering over last chain loop. Tie off.

French Knots:

Mark 1 dot for each knot placement. Step 1. 1$^{st}$ Knot. Exit needle out through dot. Pull thread through. Holding thread with left hand, between thumb and forefinger, wrap thread around needle twice. Enter needle back into dot. Before pulling thread through, tighten the thread around needle and hold close to needle with left hand. Pull thread through to inside. If making only one, tie off. If you are making others nearby, exit needle out next dot and repeat 1$^{st}$ knots instructions.

Twisted Chain Stitch:

Mark 1 row of dots using either Pattern 1, 3, or 6. Work from top toward you. Step (1) Stitch 1. Exit out dot 1. Pull thread through. Re-enter needle beside and to the left of dot 1 and exit at dot 2. With thread under tip of needle, pull thread through. Step (2) 2$^{nd}$ Stitch. Enter needle beside and to the left of dot 2 and exit at dot 3. With thread under tip of needle, pull thread through. Continue remaining stitches the same as for Step (2) 2$^{nd}$ Stitch. End with entering last dot over last chain loop. Tie off.

Cable Chain Stitch:

Mark 1 row of dots using either Pattern 1, 3, or 6. Work from top toward you. Step (1). 1$^{st}$ Stitch. Exit needle out dot 1. Pull thread through. With left hand, wrap thread counter-clockwise over and under needle. Keep looped tightly and enter needle close and directly under dot 1. Exit needle at dot 2. With thread under tip of needle, pull thread through. Step (2). 2$^{nd}$ Stitch. Wrap thread over and under needle. Keep looped tightly and enter needle at dot 2 directly under thread loop, exit needle at dot 3. With thread under tip of needle, pull thread through. Continue working remaining stitches same as 2$^{nd}$ Stitch. End with entering needle over last thread loop. Tie off Heavy Chain Stitch:

Mark 1 row of dots using either Pattern 1, 3, or 6. Work from top toward you. Step (1) 1$^{st}$ Stitch. Exit needle out of dot 1. Pull thread through Enter needle back into dot 1 and exit at dot 2. With thread under tip of needle, pull thread through. Step (2) 2$^{nd}$ Stitch. Enter needle back through dot 2, over thread loop, and exit at dot 3. Pull thread through (Note: After the first stitch, the thread is not placed under tip of needle when pulling thread through.) Step (3). Slide needle from right to left under 1$^{st}$ chain stitch (dot 2) and Step (4) re-enter needle at dot 3 and exit at dot 4. Pull thread through. 2$^{nd}$ stitch is completed. Step (5) 3$^{rd}$ Stitch. Slide needle from right to left under the two preceding chains Oust under thread loop of 1$^{st}$ stitch). Re-enter back through dot 4 and exit at dot 5. Pull thread through 3$^{rd}$ stitch is completed. Work remaining stitches same as 3$^{rd}$ stitch, sliding needle from right to left under the two preceding chains. End with sliding needle from right to left and entering back into last dot exited. Tie off.

Zig Zag Chain Stitch:

Mark dots with Patterns 5, 7, 11, or 13. Work from top toward you Step (1) 1$^{st}$ Stitch Exit needle out dot 1 of left side. Pull thread through. Re-enter needle back into same dot 1 and exit needle out dot 1 of right side. With thread under tip of needle, pull thread through. Step (2) 2$^{nd}$ Stitch Enter needle back into dot 1 of right side, piercing thread loop to hold in place, and exit out dot 2 of left side. With thread under tip of needle, pull thread through. Work remaining stitches same as 2$^{nd}$ stitch, alternating from side to side. End with entering needle over last stitch to secure. Tie off.

Square Chain Stitch:

Mark dots with Patterns 1, 6, or 16. Work from top toward you. Step (1) 1$^{st}$ Stitch. Exit needle out dot 1 of left side. Pull thread through. Enter needle through dot 1 of right side and exit at dot 2 of left side. With thread under tip of needle, pull thread through (Leave enough slack in thread so that needle can enter inside thread loop at dot 2 of right side.) Step (2). Enter needle in dot 2 of right side pulling thread tautly around needle, exit out dot 3 of left side. With thread under tip of needle, pull thread through (1$^{st}$ stitch is now completed and 2$^{nd}$ stitch begun.) Work remaining stitches the same way alternating from side to side. Step (3). End with entering needle outside of last thread loop on left side and exiting inside same thread loop on right side, pulling thread through. Re-enter outside of same thread loop on right side. Tie off. Step (3) secures last stitch in place.

CROSS STITCHES

Basic Cross Stitch:

Mark dots with Patterns 1, 6, 17, or 18. Work from right to left. Step (1). Exit out needle at dot 1 of lower line. Pull thread through. Enter needle at dot 2 of top line and exit out dot 2 of lower line. Pull thread through. Step (2). Enter needle in dot 3 of top line and exit out dot 3 of lower line. Pull thread through. Work same way to end of row. Stitches are completed by re-entering the next to last dot of top row and exiting out next to last dot of lower row. Pull thread through. Continue re-entering the next dot of top row and exiting out corresponding lower row dot. End by entering dot 1 of top row. Tie off.

To Work One Cross Stitch:

Mark two even dots on top and bottom. (Dots form a square.) Exit needle out dot 1 of lower line. Pull thread through Enter dot 2 of top line and exit out dot 2 of lower line. Pull thread through. Enter needle through dot 1 of top line. Tie off.

Long-armed Cross Stitch:

Mark row of dots with Patterns 15, 16, or 17. Work from left to right. Step (1) $^{st}$ Stitch. Exit needle out dot 1 of lower row. Pull thread through. On top line, enter needle in dot 3 and exit at dot 2. Pull thread through. Step (2). On lower row, enter needle into dot 3 and exit in dot 2. Pull thread through. ($1^{st}$ stitch is complete.) Step (3) $2^{nd}$ Stitch On top row, enter needle into dot 4 and exit out dot 3. Pull thread through. Step (4). On lower line, enter needle into dot 4 and exit out dot 3. Pull thread through Work remaining stitches same as Step (4) going to next two dots and alternating from top to lower row. End with entering needle into last dot of last stitch Tie off.

Herringbone Cross Stitch:

Mark lines with Patterns 15, 16, or 17. Work from left to right. Step (1) $1^{st}$ Stitch. On lower line, exit needle out dot 1. Pull thread through. On top line enter needle into dot 3 and exit needle at dot 2. Pull thread through. Step (2). On lower line, enter needle through dot 4 and exit out dot 3. Pull thread through. Step (3) $2^{nd}$ Stitch. On top line, enter dot 5 and exit at dot 4. Pull thread through. Step (4). On lower line, enter needle into dot 6 and exit at dot 5. Pull thread through. Work remaining stitches the same way, going to next two dots alternating from lower to top rows. End with entering needle into last dot of last stitch. Tie off.

Basic Feather Stitch:

Mark dots with Pattern 19. Work from top toward you. Step (1) $1^{st}$ Stitch. Exit needle out at dot 1 of middle row. Pull thread through Enter needle into dot 1 of right row and exit at dot 2 of middle row. With thread under tip of needle, pull thread through. Step (2) $2^{nd}$ Stitch. Enter dot 1 of left row and exit at dot 3 of middle row. With thread under tip of needle, pull thread through. Work remaining stitches same way alternating from side to side. End with entering needle over last thread loop. Tie off.

Closed Feather Stitch:

Mark dots with Patterns 11, 14, or 20. Work from top toward you. Step (1). Exit needle out at dot 1 of left side. Pull thread through. Enter needle into dot 1 of right side and exit out dot 2 of right side with thread under tip of needle, pull thread through. Step (2). Reenter needle into dot 1 of left side and exit at dot 2 of left side. With thread under tip of needle, pull thread through. Step (3). Re-enter needle into dot 2 and exit at dot 3 of right side. With thread under tip of needle, pull thread through Step (4). Re-enter dot 2 of left side and exit out dot 3 of left side. With thread under tip of needle, pull thread through Work remaining stitches the same way, alternating from side to side. End with entering outside of thread loop to secure. Tie off.

Briar Stitch:

Mark row of dots with Patterns 11, 14, or 20. Work from left to right. Step (1). Exit needle out dot 1 of lower line. Pull thread through. On top line, enter needle through dot 1 and exit needle directly below same dot 1. With thread under tip of needle, pull thread through Step (2). On lower row, enter needle through dot 2 and exit directly above same dot 2. With thread under tip of needle, pull thread through. Work remaining stitches the same way alternating from top to lower rows. End with entering needle into last dot used. Tie off.

Fly Stitch:

Mark with Patterns 5, 7, or 20. Work from left to right. Step (1) $1^{st}$ Stitch. Exit needle at dot 1 of top row. Pull thread through. Enter needle in dot 2 of top line and exit at dot 1 of lower line. With thread under tip of needle, pull thread through. Step (2) $2^{nd}$ Stitch. Enter needle over thread loop at dot 1 of lower row and exit out dot 2 of top row. Pull thread through. Work remaining stitches the same way as step (1) $1^{st}$ stitch to end of row. End with entering needle over last thread loop. Tie off. Single fly stitches are made by following Step (1) $1^{st}$ stitch.

Running Stitch:

Mark row of dots, any length, such as Patterns 1, 3, 6, or 17. Work from right to left. Exit needle out dot 1 enter dot 2 and exit dot 3. Continue the same way and you may want to carry several stitches on the needle before pulling the working thread through. On last stitch, exit needle out and tie off.

Quilting:

When quilting long straight lines near seams, hold edge of strip on seam line and mark dots at intervals which allow you to keep a straight line. Since most quilt seams are ¼" wide, Patterns 17 or 18 are ideal.

It is understood that other measured stitch pattern variations to the five specific groups of embroidery stitches may be adapted in the same manner shown on the present invention without departing from its spirit and scope set forth in the appended claims.

The foregoing detailed description has been given for clearness of understanding only and no unnecessary limitations should be understood therefrom and the appended claims should be construed as broadly as permissible, in view of the prior art.

I claim:

1. A set of ten flexible, transparent plastic stitch pattern transfer marking strips each having thereon two labeled Embroidery Stitch Patterns one of each located on opposite horizontal sides of the strip arranged in proper form with the necessary measured means consisting of horizontal, vertical and parallel rows, in and out of alignment, of round perforated holes, with certain holes having perpendicular lines extending to the outside edge of the strip indicating where a marking point should be placed, with all the means being relative in their arrangement with their relationship determining which stitch pattern included in the five groups of Embroidery Stitch Patterns is to be transposed from the strip onto fabric with the perforated holes and perpendicular lines translating into the ability for the user thereof to carry out a series of action steps conducive to the end result intended of learning to successfully construct embroidery stitch patterns.

2. A stitch pattern transfer marking strip of claim 1, having thereon one labeled measured stitch pattern comprised of a horizontal row of perforated holes with perpendicular lines extending from each hole to the outside edge of the strip and the other labeled measured stitch pattern thereon comprised of a horizontal row of multi-height perforated holes with perpendicular lines extending from each hole to the outside edge of the strip.

3. A stitch pattern transfer marking strip of claim 1, having thereon one labeled, measured stitch pattern comprised of a horizontal row of perforated holes with perpendicular lines extending from each hole to the outside edge of the strip and the other labeled measured stitch pattern thereon comprised of a horizontal row of high-low perforated holes with perpendicular lines extending to the outside edge of the strip.

4. A stitch pattern transfer marking strip of claim 1, having thereon one labeled, measured stitch pattern comprised of two, out of alignment, parallel horizontal rows of perforated holes and the other labeled measured stitch pattern comprised of a horizontal row of perforated holes with perpendicular lines extending to the outside edge of the strip.

5. A stitch pattern transfer marking strip of claim 1, having thereon one labeled, measured stitch pattern comprised of two, out of alignment, parallel horizontal rows of perforated holes and the other labeled, measured stitch pattern comprised of two aligned parallel horizontal rows of perforated holes placed in sequence of three holes, skipping two hole spaces, placing three more holes continuing in the same manner along the rows.

6. A stitch pattern transfer marking strip of claim 1, having thereon two labeled, measured stitch patterns with each comprised of a series of perforated holes forming an outside circle and a series of perforated holes forming an inside circle around the center of the circle with the two stitch patterns differing in their diameters.

7. A stitch pattern transfer marking strip of claim 1, having thereon one labeled, measured stitch pattern comprised of two, out of alignment, parallel horizontal row of perforated holes and the other labeled, measured stitch pattern comprised of two aligned parallel horizontal rows of perforated holes placed in sequence of three holes, skipping two hole spaces, placing three more holes continuing in the same manner along the rows.

8. A stitch pattern transfer marking strip of claim 1, having thereon one labeled, measured stitch pattern comprised of two, out of alignment, parallel horizontal rows of perforated holes and the other labeled, measured stitch pattern comprised of two, out of alignment, parallel horizontal rows of holes.

9. A stitch pattern transfer marking strip of claim 1, having thereon one labeled, measured stitch pattern comprised of a horizontal row of perforated holes with perpendicular lines extending to the outside edge of the strip and the other labeled, measured stitch pattern comprised of a horizontal row of perforated holes with perpendicular lines extending to the outside edge of the strip.

10. A stitch pattern transfer marking strip of claim 1, having thereon one labeled, measured stitch pattern comprised of a horizontal row of perforated holes with perpendicular lines extending to the outside edge of the strip and the other labeled, measured stitch pattern comprised of a horizontal row of perforated holes with perpendicular lines extending to the outside edge of the strip.

11. A stitch pattern transfer marking strip of claim 1, having thereon one labeled, measured stitch pattern comprised of three parallel horizontal rows of perforated holes with the two outside rows, out of alignment, with the third horizontal row equally spaced between the two outside rows and the other labeled, measured stitch pattern comprised of two, out of alignment, parallel horizontal rows of holes.

* * * * *